United States Patent
Brettner, III et al.

[19]
[11] Patent Number: 5,805,111
[45] Date of Patent: Sep. 8, 1998

[54] METHOD AND APPARATUS FOR ACCOMPLISHING EXTENDED RANGE TCAS

[75] Inventors: William Howard Brettner, III; Mark Dean Smith, both of Glendale, Ariz.

[73] Assignee: Honeywell Inc., Minneapolis, Minn.

[21] Appl. No.: 566,357

[22] Filed: Dec. 1, 1995

[51] Int. Cl.$^6$ .................................................. G01S 3/02
[52] U.S. Cl. .............................. 342/455; 342/29; 364/461
[58] Field of Search ........................ 342/29, 455; 364/461; 343/705, 708

[56] References Cited

U.S. PATENT DOCUMENTS

| | | |
|---|---|---|
| 4,027,307 | 5/1977 | Litchford . |
| 4,128,839 | 12/1978 | McComas ........................ 343/112 CA |
| 4,298,875 | 11/1981 | Sullivan ........................... 343/112 CA |
| 4,317,119 | 2/1982 | Alvarez ............................ 343/112 CA |
| 4,403,220 | 9/1983 | Donovan ................................. 343/6 R |
| 4,855,748 | 8/1989 | Brandao et al. . |
| 4,975,708 | 12/1990 | Stayton . |
| 5,029,092 | 7/1991 | Funatsu . |

OTHER PUBLICATIONS

PCT International application, International Publication No. WO 90/01202 to John Harold Dunlavy, published 8 Feb. 1990, entitled "Improvements to Aircraft Collision Avoidance".

"Introduction to TCAS II", U.S. Department of Transportation Federal Aviation Administration, Mar. 1990.

Constantine A. Balanis, "Antenna Theory Analysis and Design", Pub. by Harper & Row, 1982, pp. 514–520.

"TCAS II Study Guide", Honeywell Inc, Jan. 1993, Pub. No. 03–3841–09–04, pp. 2–1 through 2–5.

*Primary Examiner*—Thomas H. Tarcza
*Assistant Examiner*—Dao L. Phan
*Attorney, Agent, or Firm*—Brian C. Downs; Ronald E. Champion

[57] ABSTRACT

A Traffic Alert and Collision Avoidance System(TCAS) antenna is mounted on a selected forward portion of an aircraft thereby extending the effective forward range of the TCAS. The antenna and ground plane are tilted relative to conventional TCAS antennas thereby aligning a peak of the antenna's radiation pattern along the aircraft's level line of flight. The resulting increased gain directed forward of the aircraft increases the forward range of the TCAS for both receiving and transmitting TCAS signals. The invention is also useful to extend the range of other aircraft systems including transponders. Alternate embodiments include tilting a conventional TCAS antenna mounted on a middle portion of the aircraft.

22 Claims, 6 Drawing Sheets

METHOD AND APPARATUS FOR ACCOMPLISHING EXTENDED RANGE TCAS

BACKGROUND OF INVENTION

The present invention relates generally to avionics for aircraft and more specifically to airborne collision avoidance systems and transponders.

The development of an effective airborne collision avoidance system(CAS) has been the goal of the aviation community for many years. Airborne collision avoidance systems provide protection from collisions with other aircraft and are independent of ground based air traffic control.

Spurred by the collision of two airliners over the Grand Canyon in 1956, the airlines initiated a study of collision avoidance concepts. A chronology of the development of airborne collision avoidance systems can be found in "INTRODUCTION TO TCAS II", printed by the Federal Aviation Administration(FAA) of the U.S. Department of Transportation, March 1990, which is incorporated herein by reference.

By the late 1980's a system for airborne collision avoidance was developed with the cooperation of the airlines, the aviation industry, and the FAA. The system, called Traffic Alert and Collision Avoidance System II(TCAS II) was mandated by Congress to be installed on most commercial aircraft by the early 1990's.

A TCAS II equipped aircraft monitors other aircraft within approximately a 20 mile radius of the TCAS II equipped aircraft. When an intruding aircraft is determined to be a threat the TCAS II system alerts the pilot to the danger and gives the pilot bearing and distance to the intruding aircraft. If the threat is not resolved and a collision or near miss is probable the TCAS II system advises the pilot to take evasive action by either climbing or descending to avoid a collision.

Although current collision avoidance systems(CAS) such as TCAS work well, improved performance and functionality have been proposed. Specifically, the FAA would like to extend the range of CAS systems from 20 miles to 40 miles or more. It has been proposed that an extended range CAS would make flying safer and provide other benefits such as enabling aircraft to perform self-initiated air traffic control(ATC) functions over the ocean. This would allow faster aircraft to pass slower aircraft on their own during long oceanic flights, a maneuver not currently permitted even with air traffic control. This would save both time and fuel for aircraft.

The problem is that an extended range CAS system must be compatible with other currently operating CAS systems which do not have extended range capability. This implies that extended range systems must double their range of transmission and reception to be capable of communicating with a non-extended range equipped CAS aircraft. The only obvious solutions are expensive hardware upgrades to dramatically improve the performance of the system. These solutions require expensive redesigns of the entire system.

Significant cost savings would be achieved by a collision avoidance system which achieves extended range without the need for expensive hardware upgrades and redesigns.

It would be especially useful if the range of CAS systems could be more than doubled.

Clearly there exists the need for an airborne collision avoidance system which achieves extended range, makes flying safer, saves time and fuel, and achieves these goals with minimum expense and redesign.

SUMMARY OF THE INVENTION

The invention discloses a airborne collision avoidance system(CAS) which has an antenna mounted on a selected forward portion of an aircraft to extend the effective forward range of the system. The antenna and ground plane are effectively tilted compared to conventional CAS antennas thereby aligning a peak of the antenna's radiation pattern along the aircraft's level line of flight. Tilting the antenna increases the antenna's gain directed forward of the aircraft thereby increasing the forward range of the CAS. The invention is useful for both transmitting and receiving CAS signals. The invention is also useful to extend the range of other aircraft systems such as transponders. Alternate embodiments include tilting a conventional CAS antenna mounted on a middle portion of the aircraft.

The key to the invention is mounting an antenna so that a peak of the antenna's radiation pattern is directed ahead of the aircraft and along the aircraft's level line of flight. An antenna radiation pattern is a graphical representation of an antenna's gain or efficiency in various directions. Typically a radiation pattern is characterized by peaks and nulls. The peaks of the radiation pattern represent areas of optimal antenna reception and transmission(i.e. high gain). Conversely, the nulls of the radiation pattern represent areas of poor antenna reception and transmission(i.e. low gain).

For most airborne applications, such as radio communications systems, the antennas are positioned so that antenna gain is more or less evenly distributed in nearly all directions about the aircraft. This design is logical because an aircraft must communicate in all directions(i.e. 360° of azimuth) about the aircraft. Current TCAS antennas are positioned similarly so that antenna gain is distributed nearly evenly about the aircraft(i.e. the TCAS range is approximately the same in all 360° of azimuth about the aircraft).

It was discovered that a simple modification, such as moving the position of a conventional TCAS antenna, significantly increases the antenna's gain in the area directly ahead of the aircraft. This is significant for CAS applications because aircraft which are on a head-on collision course have the fastest closure rate with one's own aircraft. In contrast, aircraft approaching from the rear or sides of the TCAS equipped aircraft have a much slower closure rate.

The invention is easily implemented by merely tilting a conventional TCAS antenna. The preferred embodiment accomplishes the tilt by mounting a conventional TCAS antenna on a selected forward portion of the aircraft where the surface of the aircraft curves toward the nose of the aircraft. Mounting the antenna on this portion of the aircraft tilts the antenna and shifts the antenna's radiation pattern to extend directly ahead of the aircraft. The optimal position is aircraft specific but most aircraft require the antenna to be tilted between 5 and 30 degrees, compared to conventional antennas, to achieve optimal gain in the forward direction.

The invention's tilted antenna operates in conjunction with current TCAS antennas and does not replace them. The standard TCAS antennas provide approximately a 20 mile radius of operation around the aircraft while the invention's tilted antenna more than doubles the forward range of the system.

The modification is relatively simple, inexpensive, and will more than double the forward range of a conventional TCAS. Also, since the invention is merely a modification to a conventional TCAS antenna, very few hardware or software changes are required to utilize the invention with current TCAS units.

The invention is not limited to TCAS but is useful with any aircraft system where it is desired to extend range in a particular direction. The invention is particularly suited for extending the range of transponders.

Alternate embodiments of the invention include modifying the antenna so that the radiation pattern is tilted relative to the mounting surface. These embodiments have the advantage of being able to mount the antenna in the same position as conventional TCAS antennas(i.e. it does not have to be mounted on a tilted surface of the aircraft). The tilt is achieved by many methods including, but not limited to, redesigning the antenna so that the radiating element is tilted, putting a shim between the antenna and the aircraft, or modifying the antenna radome.

Therefore, the object of the invention is to extend the range of TCAS and transponders in a simple and cost effective manner.

A feature of the invention is a peak of the radiation pattern directed ahead of the aircraft and aligned with the aircraft's level line of flight or the horizon.

An advantage of the invention is the extended range of TCAS.

Another advantage of the invention is the minimal cost to achieve said extended range.

The significant features of the invention are illustrated in the figures and described more fully below.

DETAILED DESCRIPTION

Figure 1:
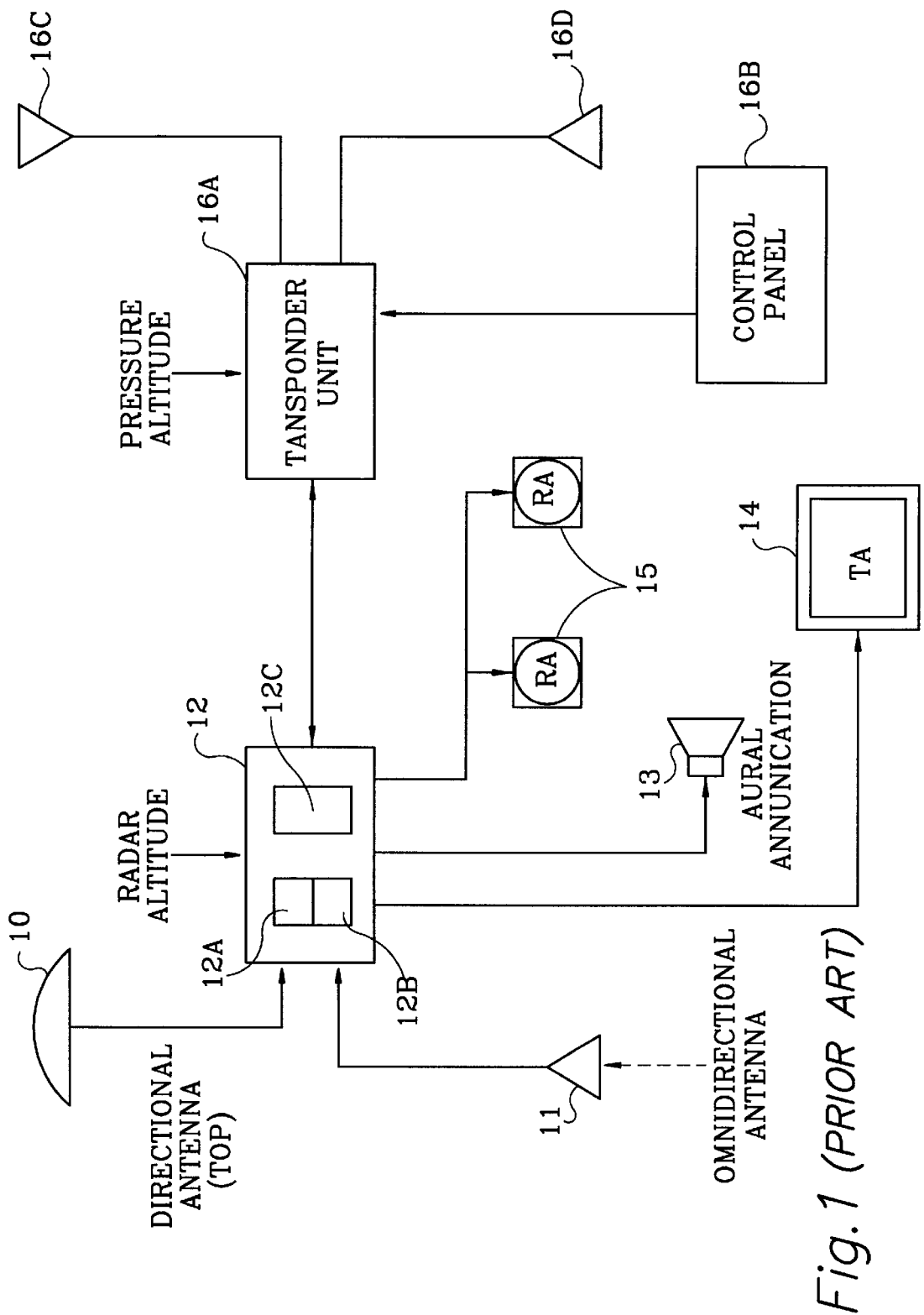
FIG. 1 is a block diagram of a typical TCAS.

FIG. 1 is a block diagram of a typical TCAS system. Shown in FIG. 1 are TCAS directional antenna 10, TCAS omnidirectional antenna 11, and TCAS computer unit 12 which includes receiver 12A, transmitter 12B, and processor 12C. Also shown are aural annunciator 13, traffic advisory (TA) display 14, and resolution advisory displays 15. Transponder 16 is comprised of transponder unit 16A, control panel 16B, and transponder antennas 16C and 16D. The TCAS and transponder operate together to function as a collision avoidance system. Those skilled in the art understand that this is merely illustrative of a typical TCAS. Many other configurations are possible such as replacing omnidirectional antenna 11 with a directional antenna.

The operation of TCAS and each component are well known in the art and need not be described in detail. An excellent discussion of TCAS can be found in "INTRODUCTION TO TCAS II" referenced above.

The present invention is primarily related to modifying or augmenting the antennas 10, 11, 16C and 16D to achieve extended useful range. The invention may be used to replace or augment any of the antennas, however, the preferred embodiment is directed toward augmenting the TCAS omnidirectional antenna 11. This embodiment is described below.

Figure 2:
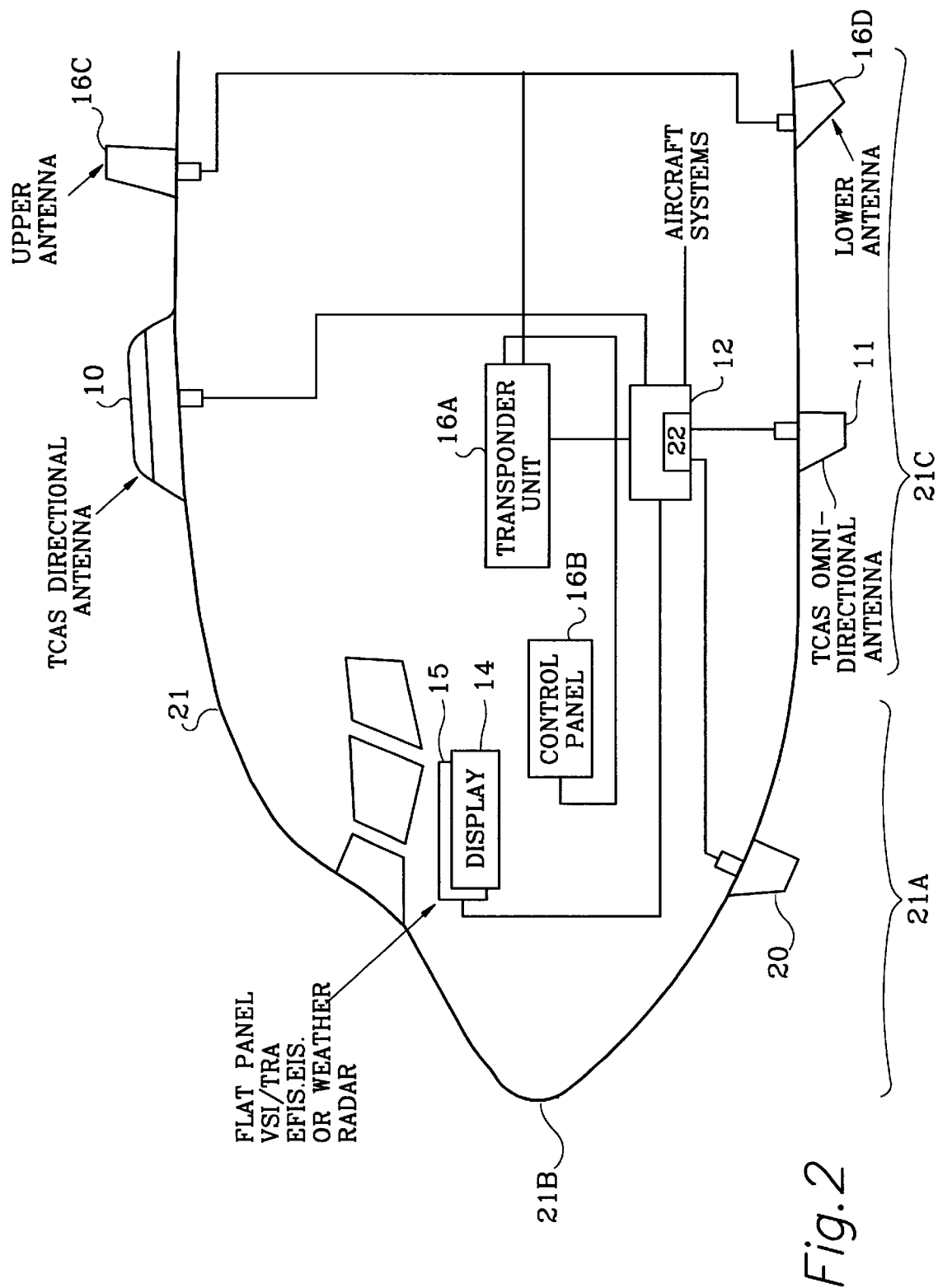
FIG. 2 illustrates the preferred embodiment of the invention.

FIG. 2 illustrates the preferred embodiment of the invention. Extended range TCAS(ERTCAS) antenna 20 is added to the conventional TCAS system of FIG. 1. ERTCAS antenna 20 is in communication with TCAS computer unit 12. ERTCAS antenna 20 is operated in conjunction with directional TCAS antenna 10 and omnidirectional TCAS antenna 11.

ERTCAS antenna 20 is mounted on the forward portion 21A of aircraft 21. Forward portion 21A is defined to be the portion of the aircraft where the surface begins to curve toward the nose 21B of the aircraft 21 and no longer maintains a relatively constant cross section. Middle portion 21C is defined to be the portion of aircraft 21 extending from forward portion 21A to the rear of aircraft 21. Most aircraft antenna are located on middle portion 21C.

The ERTCAS antenna gain is optimized for receiving and transmitting TCAS signals in the airspace directly in front of the TCAS equipped aircraft and along its level line of flight. This means optimizing gain to detect aircraft directly ahead of the TCAS equipped aircraft when it is flying in level cruise flight.

ERTCAS antenna 20 is optimized such that its radiation pattern is tilted compared to conventional TCAS antennas 10 and 11. The peak of the main lobe of the radiation pattern is aligned with the aircraft's level line of flight. The aircraft's level line of flight being defined as the projected flight path of the aircraft cruising at a constant altitude.

Antenna 20 is illustrated mounted on the bottom of aircraft 21 but it is understood that an antenna mounted at a selected position on the top, sides, or rear of aircraft 21 could also take advantage of the invention.

TCAS computer unit 12 multiplexes or switches between using ERTCAS antenna 20 and omnidirectional TCAS antenna 11 to achieve extended forward range while maintaining a 20 mile range to the sides and rear of the aircraft. Switching is accomplished with RF switch 22. Operation of RF switch 22 is either manually controlled by the pilot or automatically controlled by the TCAS computer unit. In an alternate embodiment RF switch 22 is located external to TCAS computer unit 12.

In an alternate embodiment ERTCAS antenna 20 completely replaces omnidirectional TCAS antenna 11. This is possible because in general omnidirectional TCAS antennas are only used for redundancy in case the directional antenna 10 is temporarily or permanently non-functional. The ERTCAS antenna 20 provides adequate redundancy in the event of a failure of the directional antenna 10.

ERTCAS antenna 20 may be either an omnidirectional antenna or a directional antenna. If an omnidirectional antenna is used then the range to intruding aircraft can be determined but bearing(or azimuth) of the intruding aircraft can not be determined at extended range. If a directional antenna is used then both range and bearing can be determined at extended range.

Figure 3A:
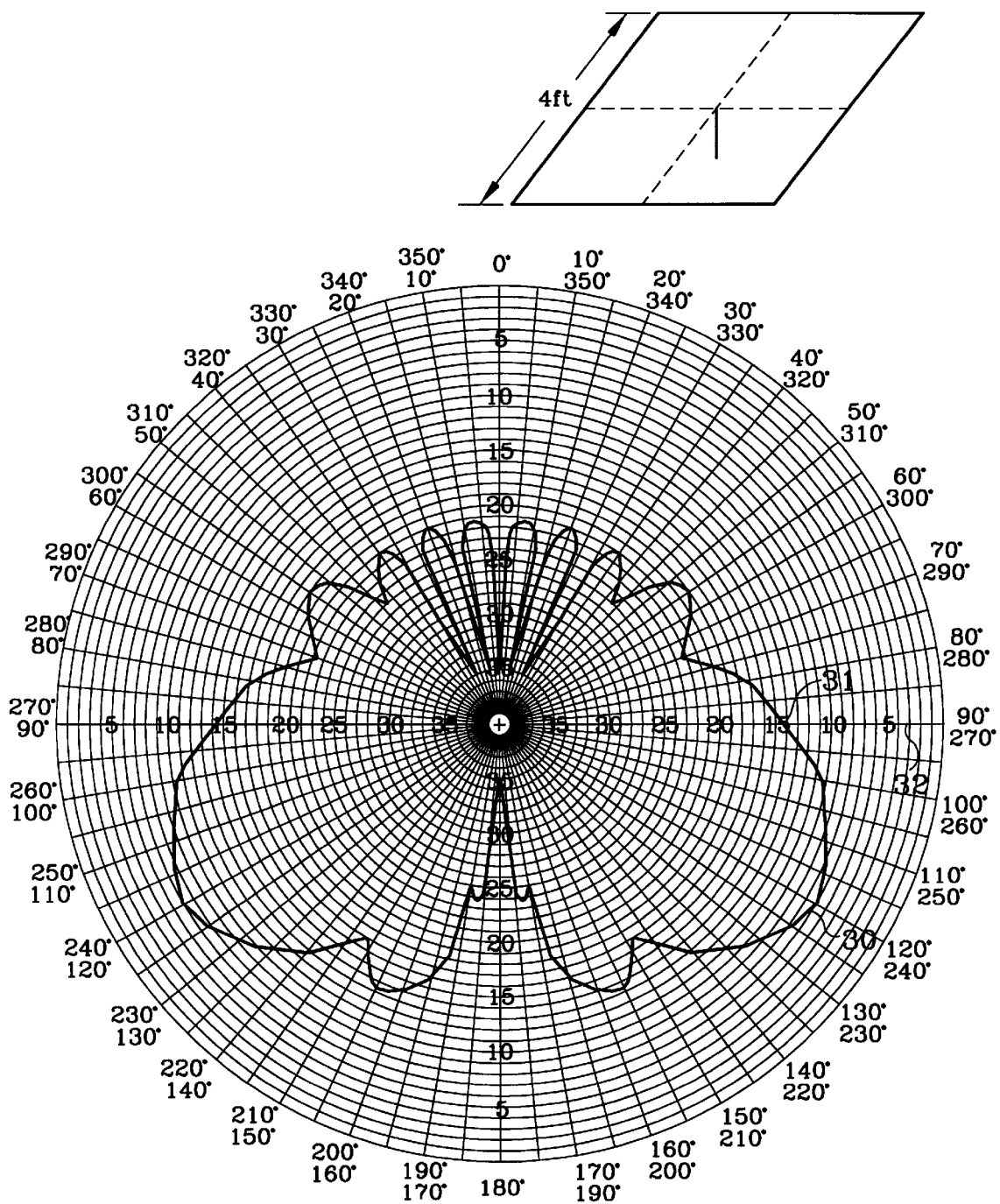
FIG. 3A illustrates an elevation radiation pattern of a monopole antenna on a finite ground plane.

FIG. 3A illustrates an elevation radiation pattern of a monopole antenna extending below a finite ground plane. The ground plane is four feet square. The radiation pattern was taken at a frequency representative of TCAS signals which operate at approximately 1 GHz. The peak gain 30 is approximately thirty degrees below the horizon 32. Comparing the horizontal gain 31 to the peak gain 30 reveals a gain difference of approximately 8 dB. The invention takes advantage of the peaks of the radiation pattern. By rotating the peak gain 30 to align with the horizon line(or 90 degree line) 32 an 8 dB gain improvement is realized along the horizon 32.

A 6 dB gain improvement will double the range of a TCAS. An 8 dB gain improvement more than doubles the range. Preliminary investigation reveals even more substantial gain improvements when the invention is implemented on an aircraft due to the much larger ground plane in the fore and aft directions of the aircraft. Gain improvements in excess of 20 dB are envisioned for some aircraft. A 20 dB gain improvement will theoretically extend the range of a conventional TCAS from 20 miles to approximately 200 miles.

Figure 3B:
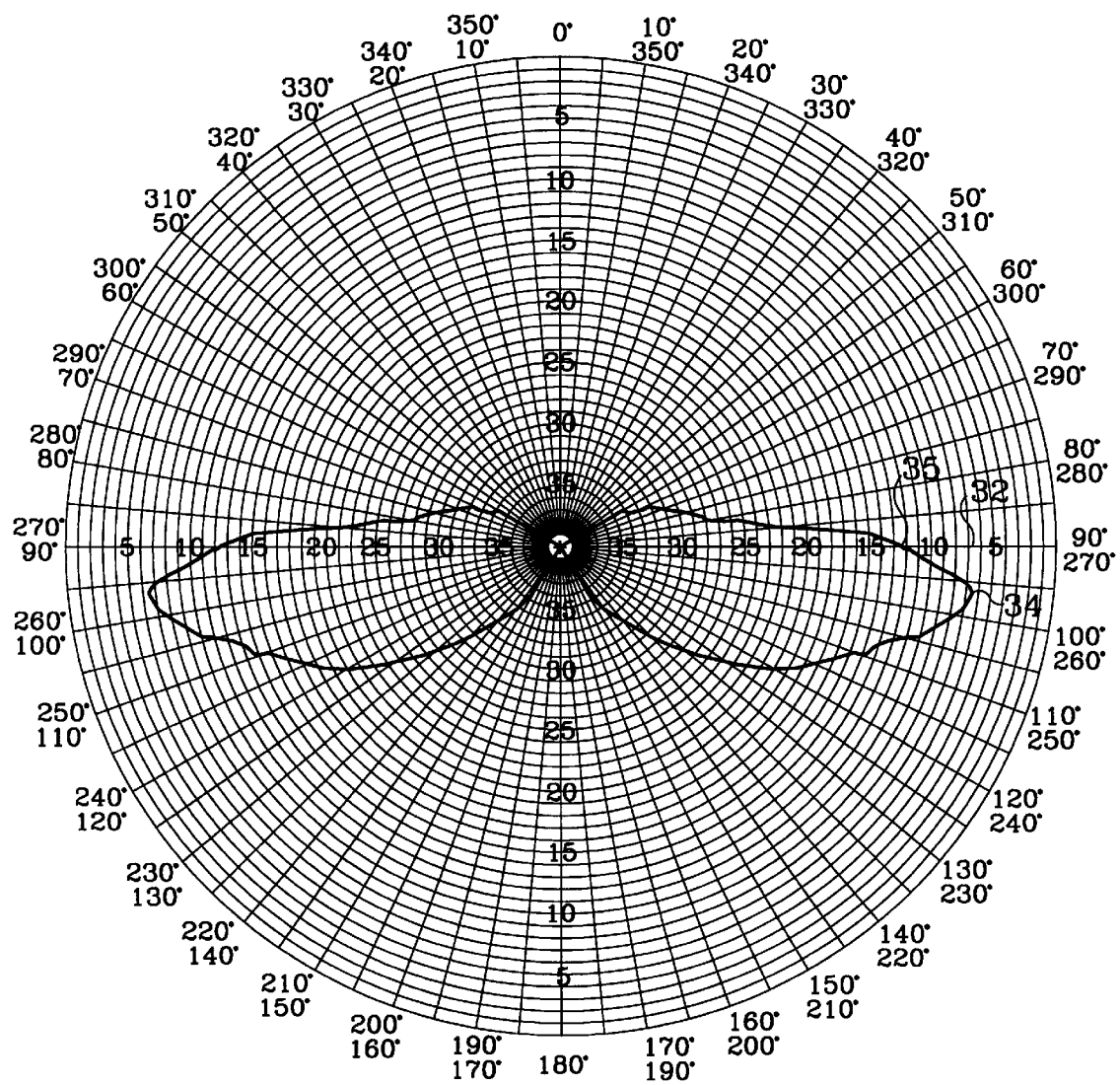
FIG. 3B illustrates an elevation radiation pattern representative of a monopole antenna mounted on the bottom of an aircraft.

FIG. 3B is an elevation radiation pattern representative of an omnidirectional type antenna 11 moup315Xmounted on the bottom of an aircraft 33. The scale represents amplitude in dB and is normalized where 0 dB is an arbitrary reference. The numbers on the scale represent dB below the peak(i.e. 0 dB) value. The 90 degree and 270 degree lines represent level line of flight(i.e. horizontal) forward and rearward of the aircraft.

Forward peak 34 of the radiation pattern shows a peak gain of approximately 6 dB below the maximum(i.e. 0 dB) value. Peak 34 is approximately 7 degrees below the level line of flight of aircraft 33. The horizontal gain 35 along the level line of flight is approximately 13 dB below maximum value.

Using the invention the radiation pattern is tilted up approximately 7 degrees so that peak 34 is aligned with the level line of flight of the aircraft 33 resulting in an improvement of 7 dB(−6−(−13)=7). A 7 dB improvement more than doubles the range of the TCAS from 20 miles to over 40 miles.

Figure 3C:
FIG. 3C illustrates an elevation radiation pattern modified as taught by the invention.
Figure 3C:
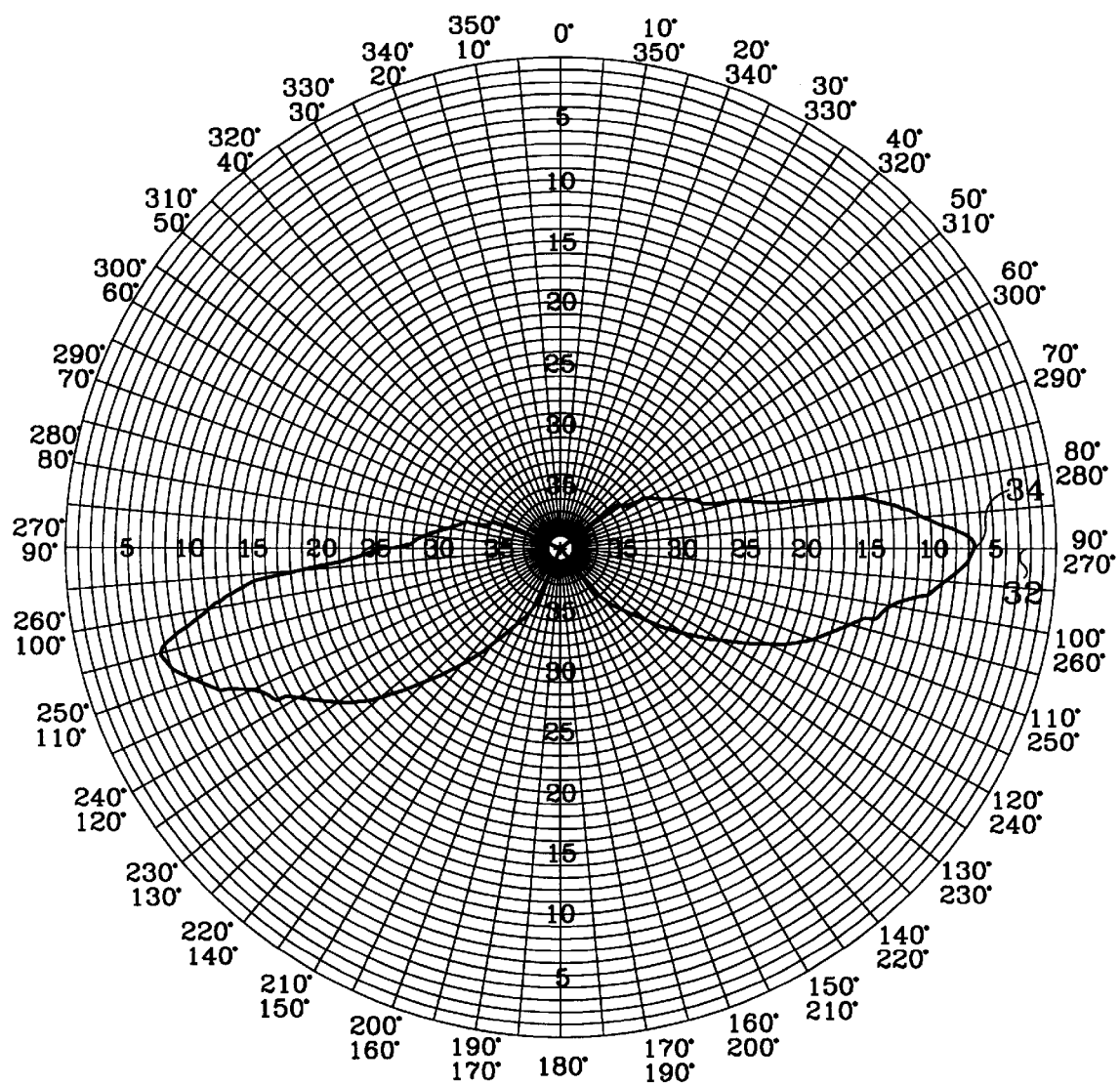

FIG. 3C illustrates a radiation pattern modified according to the invention. When antenna 20 is positioned or modified according to the invention the radiation pattern is made to align with the horizon 32 or the aircraft's level line of flight as shown. Peak 34 is aligned with the zero degree line and is therefore optimized for detecting aircraft in the airspace directly ahead of the invention equipped aircraft.

Figure 4:
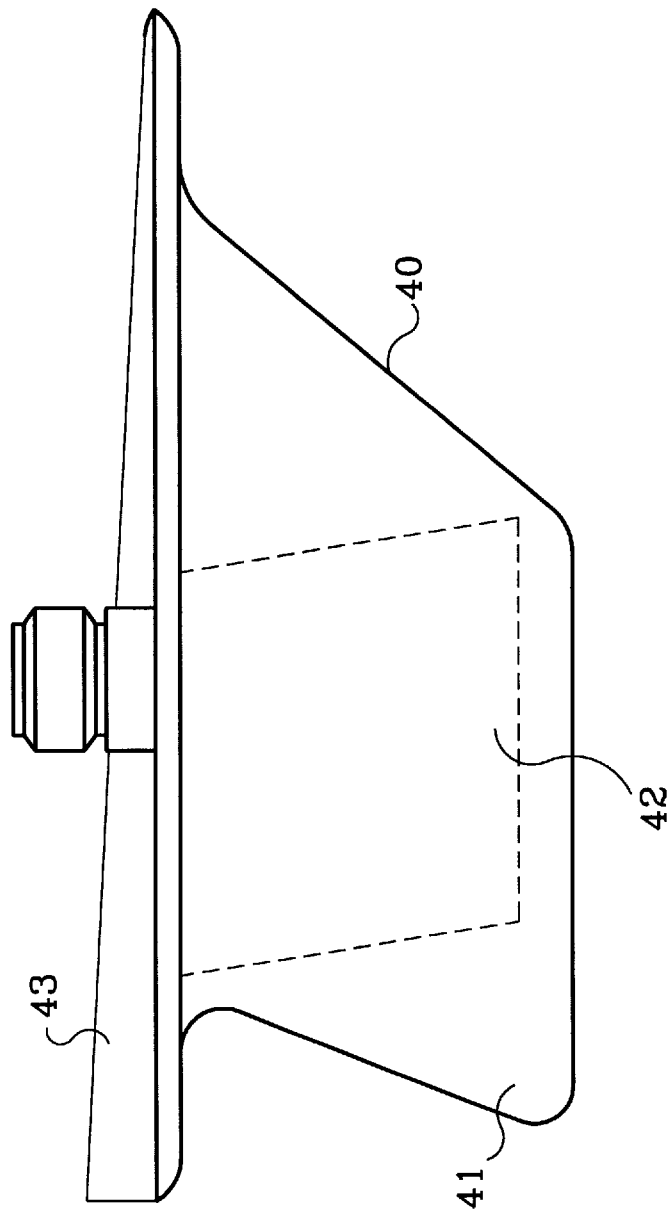
FIG. 4 illustrates two alternate embodiments of a tilted antenna.

FIG. 4 illustrates an omnidirectional type antenna modified as an alternate embodiment of the invention. Antenna 40 is comprised of a radiating element 42 located inside radome 41. Radiating element 42 is tilted forward relative to conventional antennas. The optimal tilt of radiating element 42 is aircraft specific and will therefore vary between aircraft. However, a generic antenna is envisioned in which the radiating element is tilted slightly forward. This generic antenna offers extended range for most aircraft although it is not optimal for all aircraft.

Also shown in FIG. 4 is shim 43 which is not part of antenna 40. Shim 43 is used to tilt or incline the antenna 40. Shim 43 has obvious advantages as a retrofit. Shims can easily be installed so that conventional antennas can achieve extended range as taught by the invention.

An alternate embodiment modifies the radome 41 characteristic to achieve extended range. It is well known in the art that radome materials and shape affect the transmission of electromagnetic signals. The alternate embodiment envisions modifying the radome 41 to cause the radiation pattern of the antenna to be tilted in the desired direction.

The method of the invention follows from the above description of the apparatus. An antenna is provided which is in communication with a TCAS computer unit. The antenna is mounted on the aircraft such that a peak of the antenna's radiation pattern is aligned with the level line of flight of the aircraft.

The preferred embodiment mounts the antenna at a suitably angled forward portion of the aircraft. Other embodiments include tilting the antenna or modifying the radome such that the antenna may be mounted on a conventional location of the aircraft while still achieving the desired result.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and are therefore equivalent to the invention. The invention is adaptable to almost any type of CAS system and is not limited to use by TCAS systems. Alternate embodiments envisioned include, but are not limited to, using the invention with various types of antennas, mounting the ERTCAS antenna at various suitable locations about the aircraft, adding antennas to extend the rearward range of the TCAS, and using the invention with transponders.

It is clear from the foregoing that the present invention represents a new and useful extended range TCAS method and apparatus.

The embodiments of an invention in which an exclusive property or right is claimed are defined as follows:

1. A Traffic Alert and Collision Avoidance System for an aircraft, said system comprising:
    a) a TCAS computer unit; and,
    b) an antenna in communication with said computer unit, said antenna characterized by an elevation radiation pattern having a peak which substantially aligns with said aircraft's level line of flight.

2. The Traffic Alert and Collision Avoidance System according to claim 1 wherein said antenna is tilted at an appropriate angle relative to said aircraft's level line of flight such that said peak of said radiation pattern projects substantially forward of said aircraft.

3. The Traffic Alert and Collision Avoidance System according to claim 2 wherein said antenna is mounted on a selected forward portion of said aircraft.

4. The Traffic Alert and Collision Avoidance System according to claim 2 further comprising a shim positioned between said antenna and said aircraft for tilting said antenna.

5. The Traffic Alert and Collision Avoidance System according to claim 2 wherein said antenna is an approximately omnidirectional type antenna.

6. The Traffic Alert and Collision Avoidance System according to claim 2 wherein said antenna is a directional type antenna.

7. An extended range TCAS for aircraft, said TCAS comprising:
    a) TCAS computer means for interpreting received TCAS signals; and,
    b) ERTCAS antenna means, in communication with said computer means, for receiving TCAS signals, said TCAS antenna means having a peak gain directed substantially in front of said aircraft and aligned along said aircraft's level line of flight.

8. The extended range TCAS according to claim 7 wherein said ERTCAS antenna means is an antenna tilted at a suitable angle relative to normal of said aircraft's level line of flight.

9. The extended range TCAS according to claim 8 wherein said ERTCAS antenna means is an antenna mounted on a suitably angled portion of said aircraft such that said peak gain is substantially aligned along said aircraft's level line of flight.

10. The extended range TCAS according to claim 9 wherein said ERTCAS antenna means is an antenna mounted on the forward portion of said aircraft.

11. The extended range TCAS according to claim 7 wherein said TCAS computer means includes means for generating TCAS signals and said ERTCAS antenna means includes means for transmitting said generated TCAS signals.

12. The extended range TCAS according to claim 7 further comprising:
   a) transponder means, in communication with said TCAS computer means, for transmitting and receiving transponder signals; and,
   b) extended range transponder antenna means, in communication with said transponder means, for receiving and transmitting transponder signals, said transponder antenna means having a peak gain substantially aligned along said aircraft's level line of flight.

13. A method of extending the range of a Traffic Alert and Collision Avoidance System(TCAS) of an aircraft, said TCAS including a transmitter, said method comprising:
   a) providing an antenna, said antenna in communication with said transmitter; and,
   b) mounting said antenna on said aircraft such that a peak gain of said antenna is directed in a desired elevation and azimuth relative to said aircraft such that the range of said TCAS is extended in the desired elevation and azimuth.

14. The method according to claim 13 wherein said desired elevation is between −10 degrees and +10 degrees relative to said aircraft's level line of flight.

15. The method according to claim 14 wherein said desired elevation is approximately 0 degrees relative to said aircraft's level line of flight and said desired azimuth is approximately 0 degrees relative to said aircraft's level line of flight.

16. The method according to claim 13 wherein said mounting step includes tilting said antenna between 5 and 35 degrees from normal to the aircraft's level line of flight.

17. The method according to claim 16 wherein said mounting step includes mounting said antenna on a suitably angled portion of the forward portion of said aircraft.

18. The method according to claim 13 wherein said antenna is an omnidirectional type antenna.

19. The method according to claim 13 wherein said antenna is a directional type antenna.

20. The method according to claim 13 wherein said TCAS includes a receiver and said antenna is in communication with said receiver.

21. An extended range transponder system for an aircraft, said transponder system comprising:
   a) transponder means for receiving and processing transponder signals;
   b) antenna means, in communication with said transponder means, for receiving said transponder signals and communication said transponder signals to said transponder means, said antenna means having a peak gain substantially aligned along said aircraft's level line of flight.

22. The extended range transponder system according to claim 21 wherein said transponder means includes transmitter means for generating transponder signals and said antenna means includes means for radiating said generated transponder signals to free space.

* * * * *